United States Patent
Kavak (10) Patent No.: US 7,110,403 B1
(45) Date of Patent: Sep. 19, 2006

(54) MULTICASTING IN ATM-NETWORKS

(75) Inventor: Nail Kavak, Varby (SE)

(73) Assignee: Teliasonera AB, Farsta (SE)

( * ) Notice: Subject to any disclaimer, the term of this patent is extended or adjusted under 35 U.S.C. 154(b) by 0 days.

(21) Appl. No.: 09/763,631

(22) PCT Filed: Sep. 6, 1999

(86) PCT No.: PCT/SE99/01548

§ 371 (c)(1),
(2), (4) Date: Jun. 11, 2001

(87) PCT Pub. No.: WO00/14995

PCT Pub. Date: Mar. 16, 2000

(30) Foreign Application Priority Data

Sep. 10, 1998 (SE) .................................. 9803064

(51) Int. Cl.
*H04L 12/56* (2006.01)
(52) U.S. Cl. .................... 370/390; 370/395.1; 370/432
(58) Field of Classification Search ................ 370/389, 370/390, 395.1, 395.2, 351, 352, 355, 432
See application file for complete search history.

(56) References Cited

U.S. PATENT DOCUMENTS 6,353,596 B1 * 3/2002 Grossglauser et al. ...... 370/256

FOREIGN PATENT DOCUMENTS

EP 0 800 329 10/1997

OTHER PUBLICATIONS

Grossglauser et al. "SEAM: Scalable and Efficient ATM Multicast" IEEE. Apr. 7-11, 1997. pp. 867-875.*
Nemeth et al. "IP Multicasting over ATM" High Speed Networks Laboratory. Created May 17, 1999. pp. 1-12.*
S. Komandur, et al., Computer Communication and Networks. Proceedings, 6th Int. Conf., pp. 383-388 "SPAM: A Data Forwarding Model for Multipoint-to-Multipoint Connection Support in ATM Networks," 1997.
M. Arozullah, et al., IEEE Milcom 96 Conference Proceedings, vol. 2, pp. 478-482, "A Scaleable Multicast Routing Algorithm for IP-ATM-IP Networks," 1996.

* cited by examiner

*Primary Examiner*—Derrick Ferris
(74) *Attorney, Agent, or Firm*—Oblon, Spivak, McClelland, Maier & Neustadt, P.C.

(57) ABSTRACT

A multipoint-to-multipoint multi-cast architecture in an IPATM network is significantly simpler and scales better than existing proposals because it does not require any address resolution architecture and requires substantially fewer resources in terms of virtual circuits (VC), CPU power and memory storage. The architecture includes having both sender and receivers reside on the same delivery tree and only one Virtual Circuit (VC) is used to send data over that tree. The delivery tree is a spanning tree and packets are replicated only on the branches where they are needed. An included algorithm has switches that keep track of the branches of the tree where there are group members. The interleaving of ATM cells is prevented by a VC merging mechanism. A core selection mechanism is provided which optimizes the shape of the tree structure.

37 Claims, 9 Drawing Sheets

MULTICASTING IN ATM-NETWORKS

BACKGROUND OF THE INVENTION

1. Field of the Invention

The present invention relates to ATM networks, particularly IPATM networks adapted to provide multipoint-to-multipoint multi-casting, a method of multipoint-to-multipoint multi-casting in an IPATM network and telecommunications system incorporating IPATM networks adapted to provide multipoint-to-multipoint multi-casting.

2. Discussion of Background

One of the main characteristics of multi-casting in the Internet is that, see S. E. Deering, "Multi-cast Routing in Internetworks and Extended LANs," in Proc. ACM SIGCOMM '88. August 1988, it is inherently multipoint-to-multipoint (mpt-to-mpt). However, ATM does not directly support mpt-to-mpt. This means that if ATM is to be used as an underlying technology for transport of IP multi-cast packets, efficient mpt-to-mpt communication support is essential. This can be achieved in the following ways:

(1) set-up a virtual circuit between every sender and receiver;
(2) set-up N point-to-multipoint connections; or
(3) alternatively, by providing mpt-to-mpt connections at the ATM level, as proposed by the present invention.

Option (1) is not acceptable because it requires $O(n^2)$ connections (VCs).

Option (2) is much better than option (1) because it reduces the number of VCs to O(n). However, it still requires a complicated overlay architecture for resolving and keeping track of IP group addresses and their corresponding ATM addresses.

With option (3), only one VC is used per group and there is no need for an address repository. For details of the drawbacks found with current proposals for multi-casting in IPATM networks, see:

L. Moy, "Multi-cast Extensions to OSPF", in Request For Comments 1584, March 1994;
G. J. Armitage, "Multi-cast and Multiprotocol Support for ATM based Internets", ACM Sigcomm Computer Communication Rev., vol 25, April 1995;
T. Ballardie, "Core Based Tree", SIGCOMM '93, pg: 85–95; and
D. Estrin, D. Farinacci, A Helmy, V. Jacobson, and L. Wet "Protocol Independent Multi-cast-Dense Mode (PIM-DM): Proposed experimental RFC, September 1996.

The drawbacks of current proposals for multicasting in IPATM systems can be summarized as follows:

For source routed pt-to-mpt configurations (VC mesh):
$O(n^2)$ connections are required, which do not scale for large networks;
senders must be aware of all possible receivers so they can join to the group including the receivers;
receivers must be aware of current senders;
a significant period of time is required to propagate changes whenever senders, or receivers, join, or leave, a group;
it is difficult to keep coherent and consistent group address membership lists; and
there is a high signalling overhead for joining and leaving a group;
For server based models:
the number of VCs is reduced at the expense of increased delays;
there is a single point of failure;
traffic is concentrated;
packet reflection problems occur; and
it is difficult to keep coherent and consistent group address membership lists.

SSAM (Simple and Scalable IPATM Multicast), the network architecture proposed for the present invention, uses a single shared tree for all senders and receivers. The tree is rooted at a core. Join requests from receivers and senders propagate towards the core. A network service, MNS (Multicast Network Service) provides the ATM address of the core, given an IP multi-cast address. Another important feature of this mechanism is that it provides a solution for VC interleaving problems.

In an ATM switch, when multiple incoming VCs on different switch ports must be mapped to a single outgoing VC, there is a potential contention leading to packet contention which in turn can result in packet corruption. The algorithm employed by the present invention makes an ATM switch behave as a store and forward unit, i.e. an AAL5 forwarder, or IP router, in the presence of contention, and as a cell switch in the absence of contention.

In multi-cast routing protocols using Core Based Trees (CBT), e.g. PIM (Protocol Independent Multi-casting-Sparse Mode), advertising the location of the core to every multi-cast router is an unresolved problem. Existing solutions are neither sufficiently scalable, nor sufficiently flexible.

SUMMARY OF THE INVENTION

The present invention employs a novel multipoint-to-multipoint multi-cast architecture in an IPATM network. The mechanism of the present invention is significantly simpler and scales better than existing proposals because it does not require any address resolution architecture and requires substantially fewer resources in terms of virtual circuits (VC), CPU power and memory storage.

The main characteristics of the SSAM of the present invention are that both sender and receivers reside on the same delivery tree and only one VC is used to send data over that tree. The delivery tree is a spanning tree and the packets are replicated only on the branches where they are needed. This is achieved by an algorithm in which the switches keep track of the branches of the tree where there are group members. The interleaving of ATM cells is prevented by a VC merging mechanism. A core selection mechanism is provided which optimises the shape of the tree structure.

According to a first aspect of the present invention, there is provided an IPATM transmission network, comprising a plurality of nodes and a plurality of endpoints adapted to act as data senders, or receivers, said nodes and endpoints being linked by ATM, said IPATM transmission network adapted to support multipoint-to-multipoint multi-casting between a group of endpoints, characterised in that at least one sender and all receivers, belonging to a multi-casting group of endpoints, are located on a single spanning delivery tree, and in that only one VC is employed to transmit data over said single spanning delivery tree.

According to a second aspect of the present invention, there is provided an IPATM transmission network comprising a plurality of nodes and a plurality of endpoints adapted to act as data senders, or receivers, said nodes and endpoints being linked by ATM, said IPATM transmission network adapted to support multipoint-to-multipoint multi-casting between a group of endpoints, characterised in that said IPATM transmission network includes means for building a single spanning delivery tree between at least one sender and all receivers, belonging to a multi-casting group of endpoints, and in that only one VC is employed to transmit data over said single spanning delivery tree.

Said single spanning delivery tree may be a CBT rooted in a core node.

Said CBT may be built at the ATM level

Said IPATM transmission network may include relocation means for relocating the core.

Said IPATM transmission network may be adapted to have more than one active core, said cores being geographically remote from each other.

Forwarding means adapted to forward traffic only to those branches of said single spanning delivery tree where said traffic is required may be provided.

Operation of said forwarding means may not depend on core location.

Said IPATM transmission network may include MNS means adapted to provide an ATM address for the core, on receipt of an IP multi-cast address.

Said MNS means may be adapted to provide core point management and multi-cast group management.

Said MNS means may include a hierarchy of MNS servers.

Said IPATM transmission network may have only one MNS server, and said only one MNS server may be responsible for all multi-cast group addresses.

A group having members closely located to each other, may use a multi-cast group address held by an MNS server located close to said group members, and an MNS server located close to said group members may be selected by:
  a host requesting its local MNS server for a new multi-cast group address;
  said local MNS server supplying a multi-cast address from its own addresses; or
  if said local MNS server has no unused addresses, said local MNS server suppling an address for a nearest located other MNS server.

Said MNS means may include border routers adapted to translate between protocols thereby enabling said MNS means to co-exist with other multi-cast protocols.

Means may be provided to permit leaf initiated join.

Means may be provided to facilitate an endpoint to switch from functioning as a sender to functioning as a receiver.

Means may be provided to facilitate an endpoint to switch from functioning as a receiver to functioning as a sender.

Means may be provided to enable a new member to join a group, said means being adapted to cause a join message to be propagated towards said group's core.

Multipoint-to-multipoint connections may be provided at the ATM level.

ATM switches in said IPATM transmission network may be adapted to behave as store and forward units in the presence of contention, and as cell switches in the absence of contention.

A VC merging means may be provided for preventing interleaving of ATM cells, and a core selection means may be provided to optimise the shape of a spanning delivery tree's structure.

According to a third aspect of the present invention, there is provided, in an IPATM transmission network comprising a plurality of nodes and a plurality of endpoints adapted to act as data senders, or receivers, said nodes and endpoints being linked by ATM, a method of multipoint-to-multipoint multi-casting characterised by building a single spanning delivery tree between at least one sender and all receivers, belonging to a multi-casting group of endpoints, and by employing only one VC to transmit data over said single spanning delivery tree.

Said single spanning delivery tree may be a CBT rooted in a core node.

The core may be relocated to optimise said spanning delivery tree's structure.

Traffic may be forwarded only to those branches of said single spanning delivery tree where said traffic is required.

Join requests, from receivers and senders, may be propagated towards said core.

Said IPATM transmission network may include an MNS, said MNS providing an ATM address for the core, when given an IP multi-cast address.

Packets may be replicated only on branches of said spanning delivery tree where they are needed.

The method may incorporate the following steps:
  configuring a host wishing to use said MNS with an ATM address for a local MNS server;
  said host, when it wishes to become a member of a multi-casting group, transmitting a query to a local MNS server for an address for the core of said multi-casting group;
  said local MNS server, if it is responsible for the group, replying with an ATM address for the core;
  if said local MNS is not responsible for the group, passing the query between MNS servers, in a MNS hierarchy, until it reaches a MNS server which is responsible for said group and said responsible MNS server replying to the querying host;
  said MNS hierarchy starting with a root MNS server which knows, at the next level, which server is responsible for which intervals of a multi-cast address space;
  second level MNS servers knowing how an address range they are responsible for is divided into smaller address intervals and which third level MNS server is responsible for which address interval; and
  sending queries through the MNS server hierarchy, until the MNS server, which holds the tables for the groups it is responsible for is reached.

Every MNS server may start with an empty table, and entries may be dynamically created therein.

Query passing may be realised in two different ways, namely:
  if an MNS server is not responsible for a group, passing a query to a root MNS server, which passes it on, or
  passing a query only one level up the MNS hierarchy, and not directly to the root MNS server.

The core node for a multi-cast group may be registered with the MNS server responsible for the group and, if a query arrives at an MNS server about a group and no core is specified for the group, the switch that sent the query may be elected as the core, and said switch may be able to decline nomination as the core and, if said switch does not accept nomination as the core, a spanning delivery tree may not be established.

A group having members closely located to each other, may use a multi cast group address held by an MNS server located close to said group members, and an MNS server located close to said group members may be selected by means of the following steps:
  a host requesting its local MNS server for a new multi-cast group address;
  said local MNS server then being responsible for supplying a multi-cast address from its own addresses; or if said local MNS server has no unused address, said local MNS server suppling an address for the nearest other MNS server to said local MNS server.

A join message may be caused to propagate towards said group's core when a new member indicates a desire to join a group.

A leave message may be transmitted over the spanning delivery tree associated with a group towards said group's core when a member of that group indicates a desire to leave the group, said leave message may travel until it reaches a first junction of said spanning delivery tree, and that part of said spanning delivery tree over which said message has travelled may be removed.

Group members may periodically send an "I am alive" message to neighbouring nodes, or endpoints.

According to a fourth aspect of the present invention, there is provided a telecommunications system, characterised in that said telecommunications system includes an IPATM transmission network as set forth in any preceding paragraph and, or operating a method as set forth in any preceding paragraph.

BRIEF DESCRIPTION OF THE DRAWINGS

Embodiments of the invention will now be described, by way of example, with reference to the accompanying drawings, in which.

In order to assist in understanding this patent specification, a glossary of some of the abbreviations used herein is set out below:

DESCRIPTION OF THE PREFERRED EMBODIMENTS

| | |
|---|---|
| AAL5: | ATM Adaption Layer 5 |
| ATM: | Asynchronous Transfer Mode |
| CBT: | Core Based Tree |
| CPU: | Central Processor Unit |
| DNS: | Domain Name Service |
| DVMRP: | Distance Vector Multi-cast Routing Protocol |
| EOP: | End of Packet |
| IP: | Internet Protocol |
| IPATM: | Internet Protocol Asynchronous Transfer Mode |
| MNS: | Multi-cast Network Service |
| PIM: | Protocol Independent Multi-casting Sparse Mode |
| SAAM: | Simple and Scalable IPATM Multi-cast |
| VC: | Virtual Circuit |

As previously stated, in multi-cast routing protocols that use Core Based Trees (CBT), for example PIM (Protocol Independent Multi-casting-Sparse Mode), advertising the location of the core to every multi-cast router is a largely unresolved problem. Existing solutions are not sufficiently scalable, or flexible.

A protocol proposal, which is designed to distribute the address of the core for a given multi-cast group, will now be described. This protocol is designed to co operate with SAAM, but can be used in other protocols which use the Core Based Tree paradigm. Its main function is core point management, but it can be used for multi-cast group management as well. It can be readily extended to answer questions such as "give me an unused IP multi-cast address". The name of the proposed protocol is Multi-cast Network Services, or MNS.

MNS can be considered to be analogous to a multi-cast extension of the well known Domain Name Service (MNS). A hierarchy of Multi-cast Name Service servers (MNS servers) can be made responsible for solving the problems referred to above. Just as with MNS, MNS servers work by passing queries between each other. However, unlike the MNS, this system is dynamic.

The way in which the MNS operates will now be described. First of all, every host wishing to use the services of the MNS, must be configured with the ATM address of the local MNS server. When this host wishes to become a member of a multi-casting group, it queries the local MNS server for the address of the core for that group. If the local MNS is responsible for that particular group address (in IPv4 it is a class D address), then it replies with the ATM address of the core. If the local MNS is not responsible for that particular group address the query is passed between the MNS servers until it reaches the server which is responsible for the group and then this server will reply to the querying host. The MNS hierarchy starts with a root MNS server which knows, at the next level, which server is responsible for which intervals of the multi-cast (class D) address space. Similarly, the second level servers will know how the range, for which they are responsible, is divided into smaller intervals and which third level server is responsible for which interval. This hierarchy is repeated, until the server, which holds the tables for the groups it is responsible for is reached.

For fault tolerance and performance reasons, a larger network requires a number of MNS servers to be responsible for the same range of addresses. In this case server synchronization must also be dealt with. Every MNS server starts with an empty table, and entries are created dynamically. This makes it possible to have a small network with only one MNS server, which is then responsible for all multi-cast group addresses.

Query passing is realized in two different ways, namely:
 if an MNS server is not responsible for a group, then the query is passed to the root MNS server, which passes it on;

the query is passed only one level up the hierarchy, and not directly to the root.

Both solutions have their advantages and disadvantages. If the responsible MNS server for the queried group and the MNS server that received the query, are in different branches of the MNS hierarchy, then the former method is the better. On the other hand. If the responsible server and the queried server are close together in the hierarchy, then the latter method gives the better result. If the answer to the queries arriving at an MNS server are identically distributed between all of the MNS servers, then the first algorithm gives a quicker response time, but that algorithm puts a heavier load on the root server, since every query, which cannot be answered by the server first asked, must go through the root server, or one of the root servers.

As a first approach, an MNS entry stores the multi-cast group address as the key and the ATM address of the corresponding core, if it has one. If there is no core, it means that no tree has been established for that particular multi-cast group. Other fields may be included too, for example, a reference to the identity of the users of the group address. The file may contain the address of the originator, or a service name string, or the like.

The core point for a multi-cast group must be registered with the MNS server responsible for the group. As a first approach, if a query arrives at an MNS server about a group and no core is specified for the group, the switch that sent the query will be elected as the core. This switch may, or may not, accept nomination as the core. In the latter case the tree will not be set up and no communication will be available until a switch has accepted the core role. It is the responsibility of the core to destroy the tree, when it is no longer used. The precise details of decision making relating to destruction of a tree is beyond the scope of the present invention and will not be described in this specification. After destroying the tree, the core sends a notification of tree destruction to the responsible MNS server so that it can delete the corresponding entry from its table.

Since MNS servers will be spread around the world it is justified for a group, having members closely located to each other, to use a multi-cast group address which is held by an MNS server located close to them. It is easy to accomplish this with the following algorithm:

when a host needs a new multi-cast group address it asks its local MNS server for it;

the MNS server is then responsible for supplying one multi-cast address from its own addresses; or if the MNS server has no unused address;

the MNS server supplies an address for the closest MNS server.

The MNS system must be able to co-exist with other multi-cast protocols, e.g. Ethernet, or Token-ring based systems, such as DVMRP (Distance Vector Multi-cast Routing Protocol), or PIM (Protocol Independent Multi-casting). Co-existence can be achieved by using border routers which have both of the protocols and can translate between them. The usual problems, such as looping, which can occur as the MNS cloud shortcuts two branches of a DVMRP tree, can be resolved as well. The details of interconnection issues is beyond the scope of the present invention and will not be described in this patent specification. MNS is intended to be a global system, it will not, of course, immediately on realization, instantly spread around the world. In the first phase, it is expected that separate MNS sub-networks will be interconnected by conventional multi-cast routing protocols. In this case every MNS sub-network will have its own server hierarchy. If two MNS sub-networks are merged, the server hierarchy must be reconfigured accordingly.

A list of MNS messages is set out below.

(1) Query <Multi-cast address>: Sent from a switch to its local MNS server. The address of the core for the given multi-cast address is requested. The switch will not accept nomination as the core for the group if a core does not exist.

(2) QueryAssign <Multi-cast address>: Sent from a switch to its local MNS server. The address of the core for the given multi-cast address is requested. The switch will accept nomination as the core for the group if a core does not already exist.

(3) NegResp <Multi-cast address>: Negative response. Sent from the MNS server to the querying switch. Query was received, but the core for specified group was not found.

(4) Resp <Multi-cast address, ATM address of the core>. Positive response. Sent from the MNS server to the querying switch, contains the ATM address of the core. The core for the specified group was found, or it was not found, but QueryAssign was sent. In the latter case, the requesting switch will be assigned the core rote so its ATM Address is contained in the message.

(5) MNSResp <Multi-cast address, NetMask, MNS servers ATM address>: Sent from the an MNS server to the querying switch. Indicates which MNS server is responsible for the multi-cast groups specified by the multi-cast address and the netmask.

(7) CoreDel <Multi-cast address>: Sent by the core to the MNS server responsible for the multi-cast address, perhaps the Local MNS server, Requests deletion of the specified multi-cast group from the database.

(8) ReqNew <>: Sent by a switch to its local MNS server. Requests an unused multi-cast group address.

(9) NewResp <Multi-cast address>: Sent from an MNS server to the requesting switch. Supplies an unused multi-cast group address.

Issues associated with tree management will now be described. As mentioned above, SSAM has many advantages over other proposals. It has all the benefits of the CBT algorithms, since SSAM uses the CBT paradigm on the ATM level. There are three facts, which must be taken into account when considering tree management issues, namely:

there is no centralised database of the group members, this enables easy scalability;

SAM requires little state information to be held in the routers, since there is one common spanning tree for a group—unlike in many other cases, where there is one tree per source; and leaf initiated join is possible which is useful for scalability and ease of use.

In addition to this, SSAM is fast, since the Core Based Tree is built at a low level which, in the case of the present invention, is ATM, instead of the IP level.

Of course there are some disadvantages associated with SSAM. For example, SSAM requires modifications to be made to existing algorithms and products, for example:

ATM level signalling must be modified; and

ATM switches must also be modified.

One the most important issues relating to SSAM is that of core selection. The location of the core of the tree is crucial, since the whole tree will be organized around the core, its location is the only factor that can determine the optimality of the tree. Another important issue is that of core management. This term includes two main functionalities, namely:

relocation of the core: and replication of the core for fault tolerance reasons.

Figure 1:
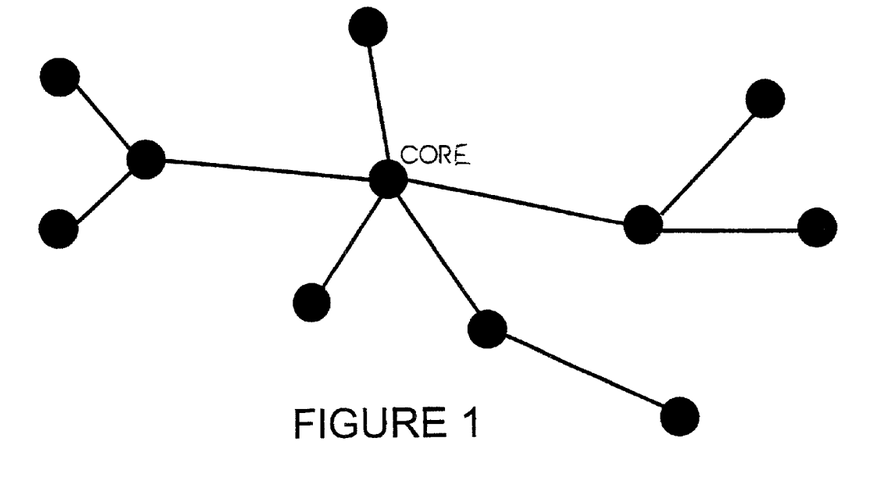
FIG. 1 illustrates an optimal core placement in an IPATM network according to the present invention.
Figure 2:
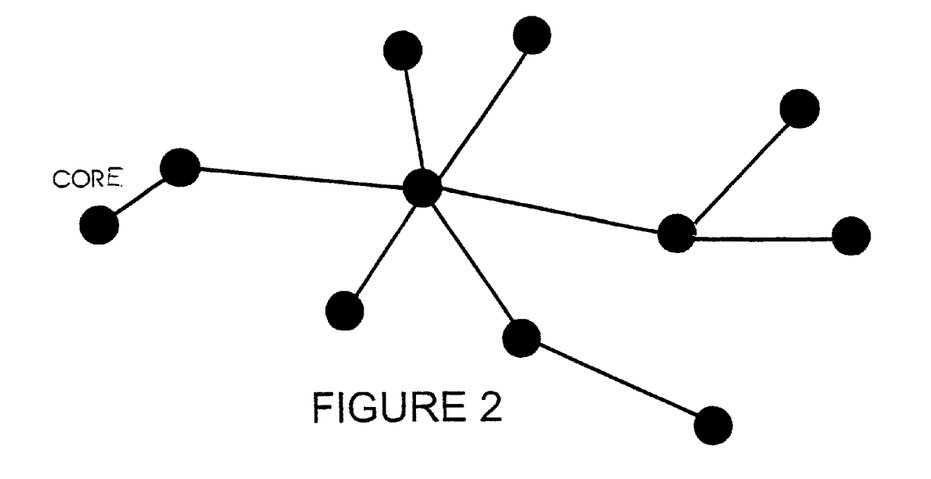
FIG. 2 illustrates a badly placed core in an IPATM network according to the present invention.

Relocation of the core can be necessary, when the core is not located at, or near, the centre of the tree. This is illustrated in FIGS. 1 and 2, where FIG. 1 shows a tree with an optimally located core and FIG. 2 shows a tree with a badly located core which really requires relocation.

It is important to emphasize that a wrong core placement does not mean that the protocol will not work. In the case of SSAM, it does not even mean that all data will be forwarded to the core, which is remote. It simply means that the spanning tree will have a sub-optimal shape and the signalling messages will have to travel longer distances to the core, which is further away than necessary.

Core relocation raises many questions, for example: "when should the core be moved? Having answered this question it is necessary to determine where the core should be relocated. The algorithm used to determine a relocation site for the core may not be the same as the algorithm used to determine the initial location of the core, because more information on the group members will be available at the time of relocation than was available at the time of initial core location. After the migration of the core, the tree may have to be recreated. Tree reconstruction is beyond the scope of the present invention.

Figure 3:
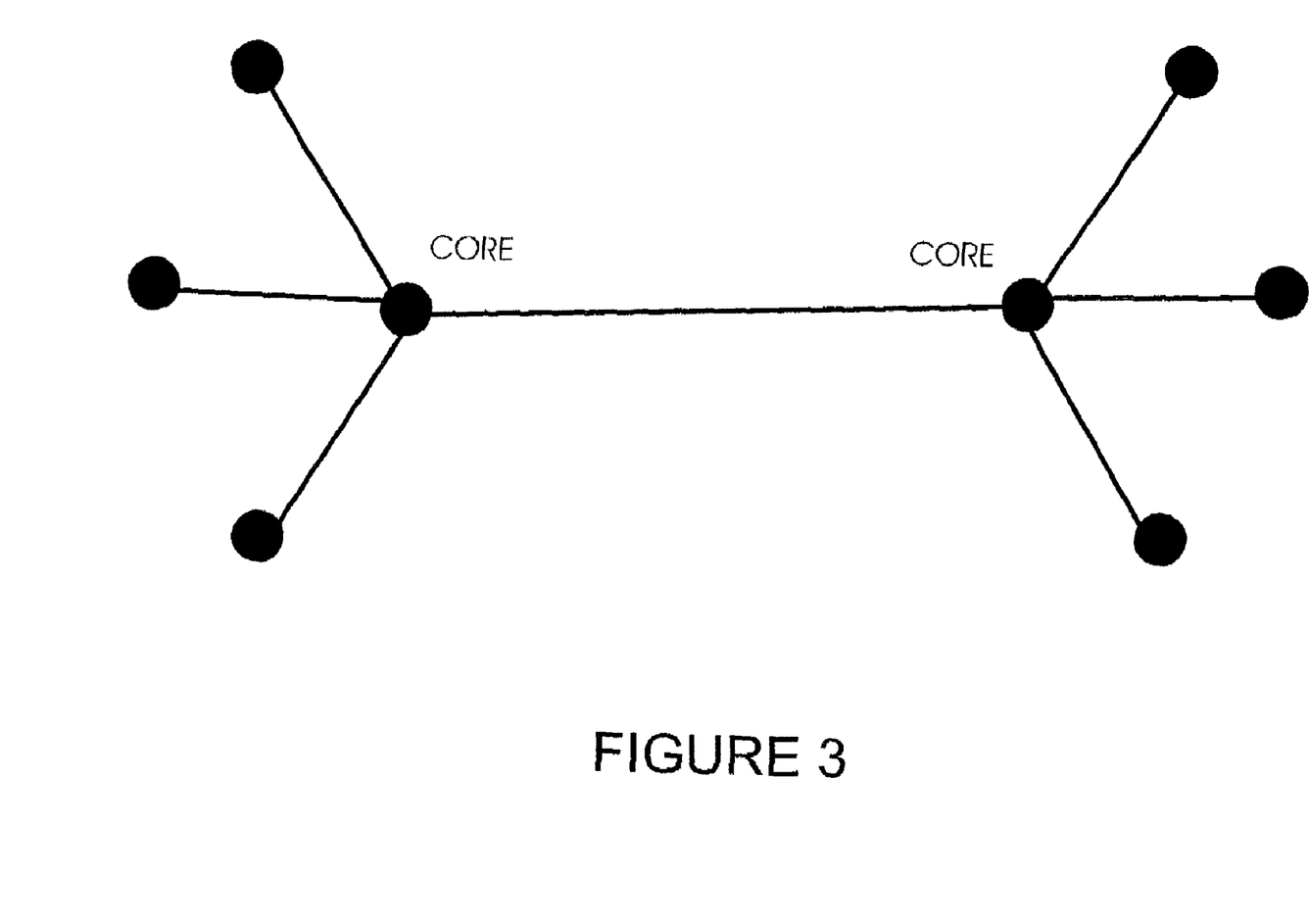
FIG. 3 illustrates an IPATM network, according to the present invention, having multiple cores.

Replication of the core is necessary for the protocol to be robust. Multiple active cores are interesting because they enable participants to be organized around cores which are remote from each other. It is practical, when say six members are in a conference, three on a first site and three on a second site, remote from the first site, to have two cores, one located on each of the two sites. This scenario is illustrated in FIG. 3. This architecture enables new members to be efficiently joined to the group at either site, thus avoiding the problems, mentioned above, associated with badly located cores.

Finally, an algorithm is required to enable potential group members, or their switches, to map from the multi-cast group IP address, to the ATM address, of the core. This process will be described in greater detail below.

Figure 4:
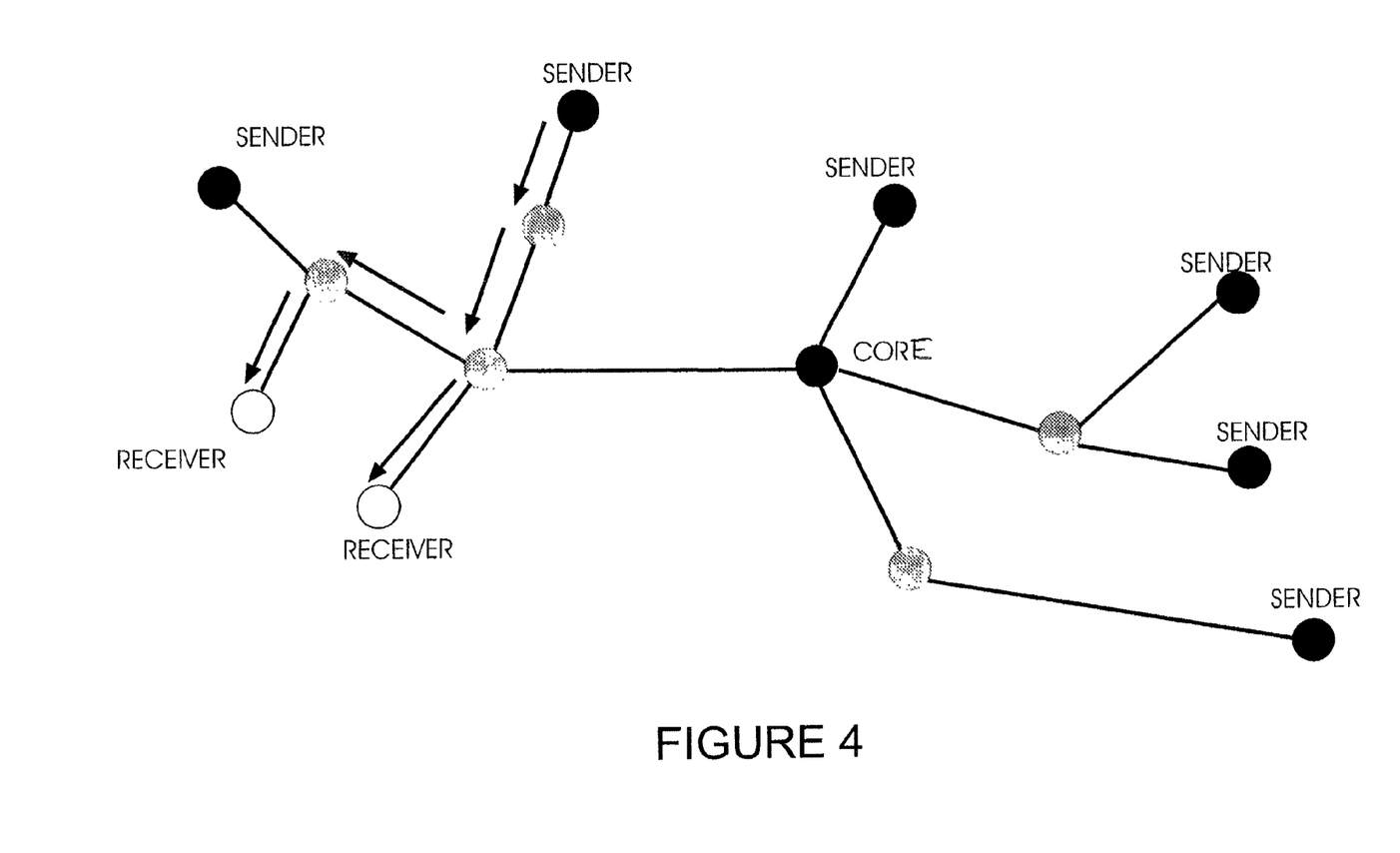
FIG. 4 illustrates an optimal data forwarding scheme in an IPATM network according to the present invention.

The kind of state information which needs to be stored in the nodes of the tree for enabling efficient working will now be described. An algorithm for managing the tree and handling membership changes, in a way that preserves the integrity of the tree, will also be described. The aim is to create an optimal data forwarding algorithm within a given tree, which means senders and receivers in a multi-cast group are both part of the same tree. The objective is to have an algorithm, which forwards the traffic only to those branches of the tree, where the traffic is required. This means, that no data will be forwarded towards a branch, where there are only senders. This also implies, that the algorithm should not depend on the location of the core. FIG. 4 shows an example, where the only active sender is Sender 2, and the necessary data paths are marked with an arrow.

Figure 5:
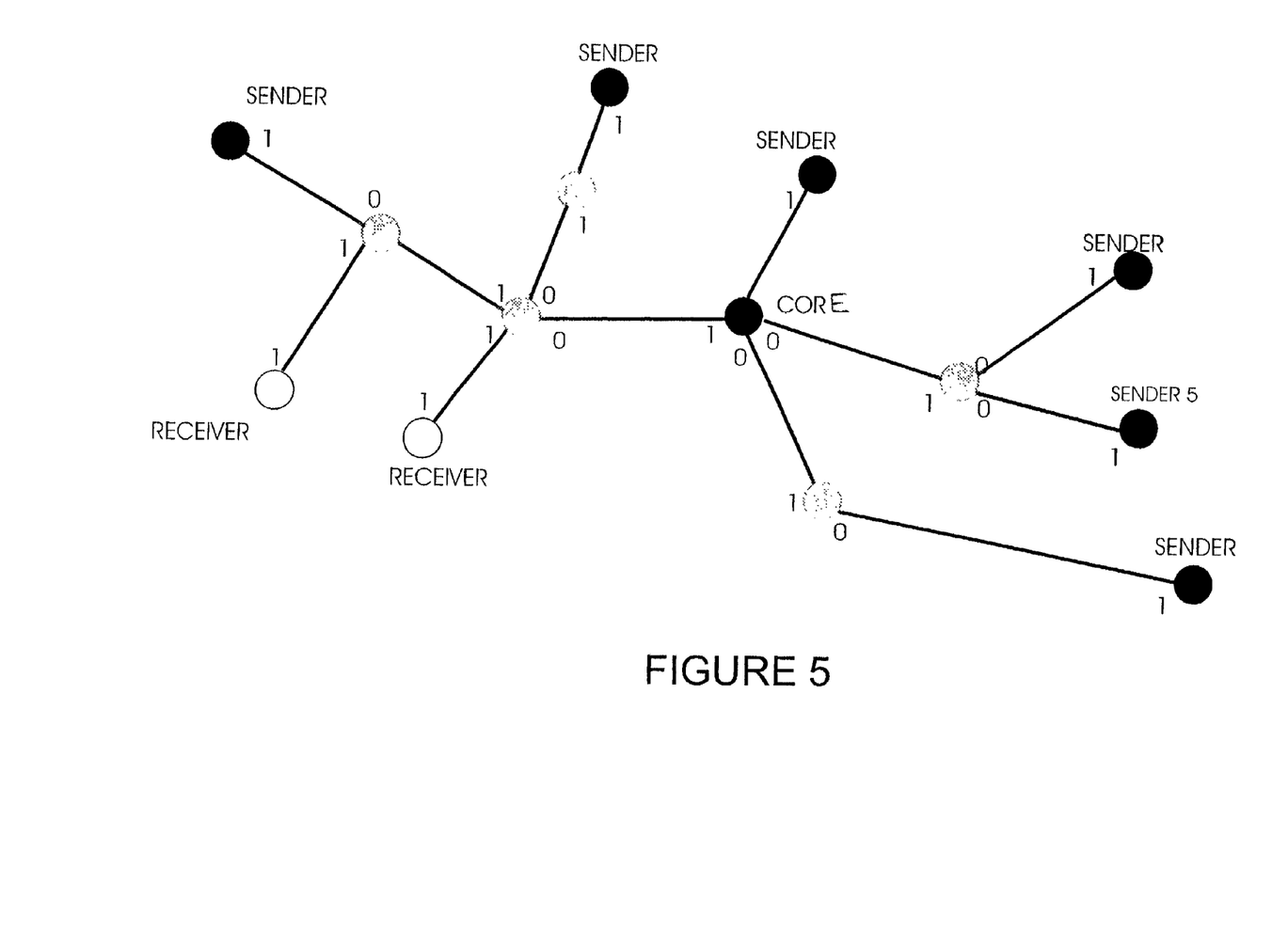
FIG. 5 illustrates the state information stored in a IPATM network tree.

Consider first what information must be stored in each node of the tree so that optimal data paths can be established within the tree. As can be readily seen from FIG. 5, only two bits per link are required for this purpose. A "one" at the end of a link shows that traffic should be sent over that link in that direction, because there is at least one receiver at the other side of the link. A "zero" indicates, that there are no receivers at the other side of the link, so traffic should not be sent in that direction. This can be clearly seen by comparing FIGS. 4. and 5. It should be noted that a receiver can also be a sender.

The way in which membership changes are handled to correctly preserve the state bits, will now be described.

Figure 6:
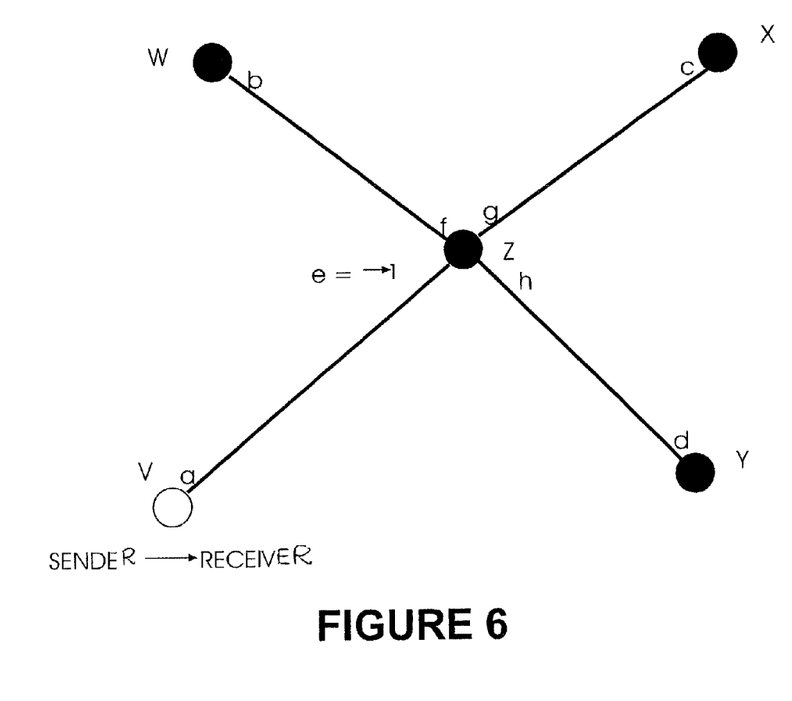
FIG. 6 illustrates the process of a network endpoint converting from data sender to data receiver.

FIG. 6 illustrates a situation in which an endpoint, switches from being a sender to being a receiver. Since the endpoint V is now a receiver, the value of 'e' must be changed from '0' to '1'. Because of this, 'b', 'c' and 'd' must also be set to '1'. If any of 'b', 'c', or 'd', are '0' before the switch, then the algorithm must be recursively re-run in the corresponding W, X and Y nodes. This means that when, for example, the algorithm is re-run in node W, nodes V, X and Y can be temporally ignored and running the algorithm in node Z, a former sender, converts node Z to a receiver with respect to node W. This simple algorithm should not require further explanation for those skilled in the art. Of course, the topology of the tree near the endpoint V can differ from that illustrated in FIG. 6. It should be clear to those skilled in the art how to construct an algorithm for topologies other than that illustrated in FIG. 6, from the above description.

Figure 7:
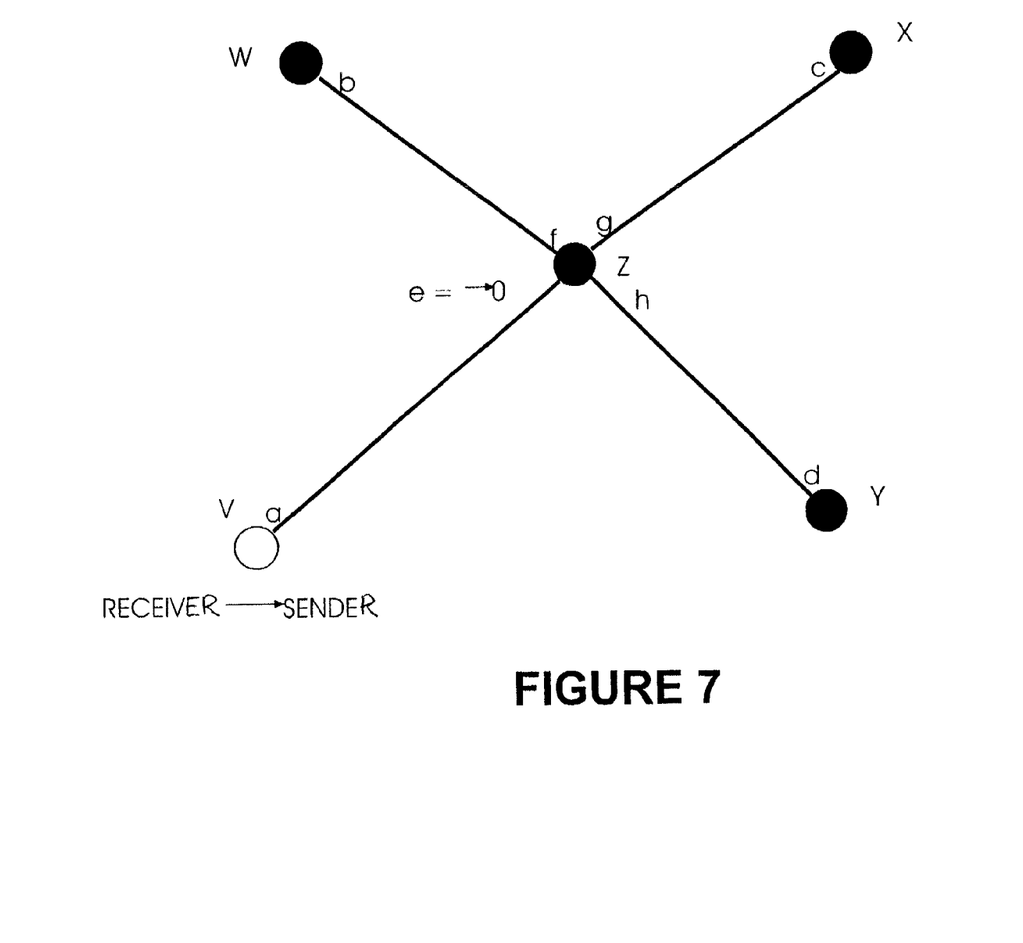
FIG. 7 illustrates the process of a network endpoint converting from data receiver to data sender.

Consider now the opposite situation, i.e. a receiver becomes a sender. This process is illustrated in FIG. 7. In this case, since V has become a sender, 'e' changes from one to zero. Before the change, 'a'='f' OR 'g' OR 'h', where "OR" means the binary "OR" function. After the change, the value of 'a' naturally remains the same, as 'f', 'g' and 'h' are unchanged. Before the change the values of 'b', 'c' and 'd' were all '1', and may be changed, according to the following algorithm.

(1) if there are at least two '1's amongst 'f', 'g' and 'h', then nothing more needs to be changed, since all traffic has to go through the node Z.

(2) If there is exactly one '1' amongst 'f', 'g' and 'h', say 'f'='1', 'g'='h'='0', then all traffic coming from the nodes V; X and Y has to go through Z, so the value of 'a', 'c' and 'd' need not be changed. The value of 'b', however, must be changed to '0' from '1', since data coming from W no longer needs to travel towards Z. Because the value of 'b' has been changed, this algorithm has to be re-run on node W as well, as described in the previous subsection.

(3) If 'f'='g'='h'='0' before the change then, for the reasons detailed above, 'b', 'c' and 'd' become '0', and the algorithm must be re-run in nodes W, X and Y.

So far the processes involved in converting a receiver to a sender and vice versa have been discussed. The process associated with a new member joining the tree, see FIG. 8, will now be described.

Figure 8:
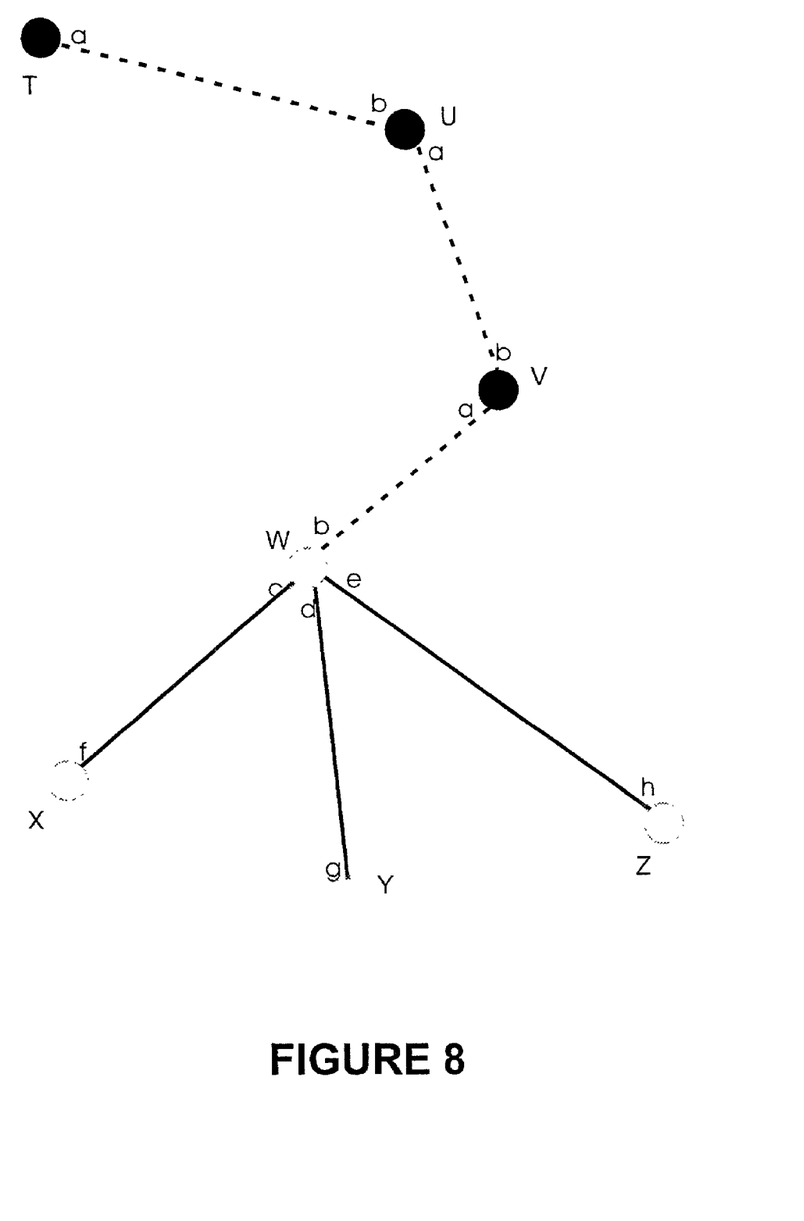
FIG. 8 illustrates the process of adding a new branch to an IPATM network tree.

Referring to FIG. 8, if the endpoint T wishes to join the tree, it must send a join message towards the core. This message travels hop-by-hop until it hits a branch from the tree. In the example shown in FIG. 8, a quite general case of a join message hitting an existing tree in the middle of the tree is illustrated. Node W has three outgoing links in the tree. Consider the way in which the state bits should be modified in this case. First of all, it should be intuitively clear that the values of the 'a's, shown in FIG. 8, must be the same. The same holds for the values of the 'b's. It is also easy to prove, that 'a'='c' OR 'd' OR 'e'. Furthermore, if the endpoint T joins as a receiver, then 'b'='1', otherwise 'b'='a'. All that remains is that if T is a receiver, then the "sender becomes a receiver" algorithm must be run on node W, as if V were part of the tree prior to the joining, but has now changed from being a sender to being a receiver.

When a member decides to leave the group, it must send a leave message, in the tree, towards the core. The message travels until it reaches the first junction of the tree. That part of the tree is then removed, as show in FIG. 9.

Figure 9:
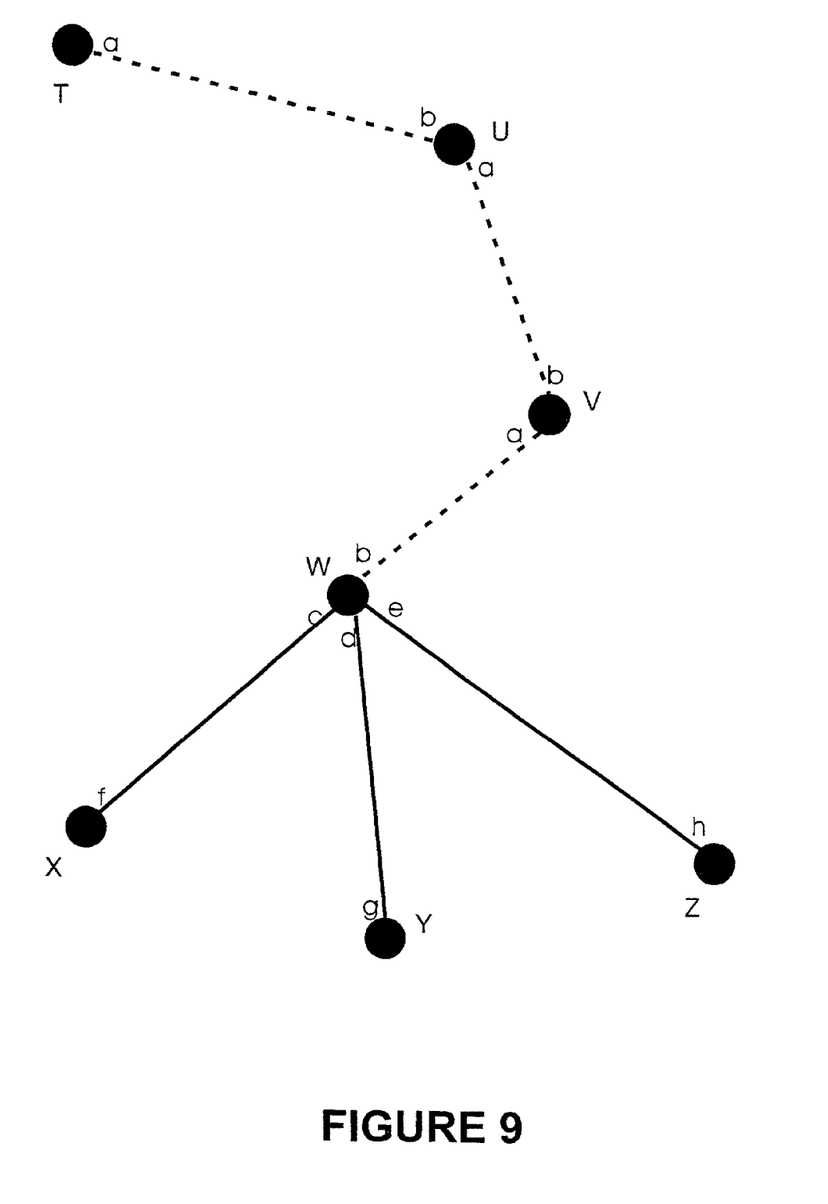
FIG. 9 illustrates the process of removing a branch from an IPATM network tree.

As shown in FIG. 9, T wishes to leave the tree, and the T-U-V branch will be removed. After removal from the tree, if T was a receiver, then the algorithm "receiver becomes a sender" must be run on W, as if V became a sender from a receiver.

An algorithm, for maintaining the integrity of the tree when group membership changes, has been described above. Other tree management issues include:
   tree destruction, when a group ceases to exist; and
   protection of the tree against link, or node, failures, which can result, for example, in a member not leaving the tree, thus preventing the tree from ever being destroyed.

One possible solution to the latter problem is for group members to periodically send an "I am alive" message to neighbours. This provides information about equipment failures.

VP/VC merging will now be described. Cells belonging to one AAL frame cannot be mixed, since they are distinguished only by their order. The basic problem with VC merging is that when two frames from two incoming VCs must be merged into one outgoing VC, then all the cells of the first frame must be sent out first, followed by all the cells of the second frame.

Figure 10:
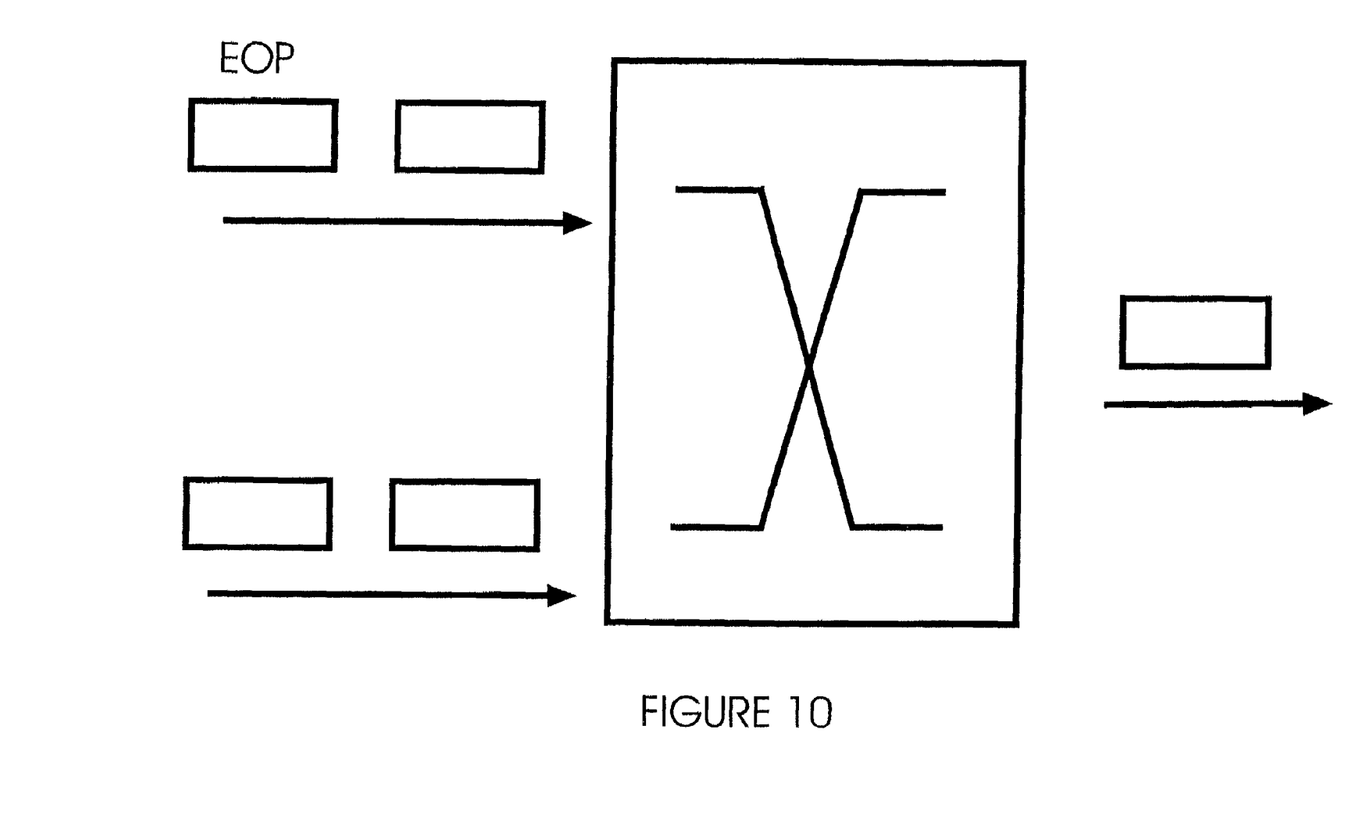
FIG. 10 illustrates the process of VC merging.

The algorithm for SSAM works with AAL5 frames. Assembling the cells into AAL frames, queueing them and then repartitioning them into frames, in a similar manner to a router, would be too slow. Therefore, the switch must queue at the cell level. This is accomplished by taking advantage of the fact that the AAL5 end-of-packet identifier bit is part of the header of the ATM cell, so that switches can easily identify the last cell of a frame. A possible enhancement to the algorithm, after which it can be described as cut-through forwarding, is that the first frame to reach the switch may not need to be queued. This can make the forwarding smoother, but could make the situation worse when the last cell of the first frame arrives later than last cells of other frames. In this case, a timer is used to prevent an indefinite state. Also the loss of the last cell can cause problems. The solution provided by the present invention is that a new EOP cell is inserted to prevent the net hop discarding cells/packets because of the lack of an EOP-bit cell, as shown in FIG. 10.

What is claimed is:

1. An IPATM transmission network that supports multipoint-to-multipoint multi-casting between groups of end points, said network comprising:
   a plurality of nodes;
   a plurality of endpoints adapted to act as data senders, or receivers, said nodes and endpoints being linked by ATM, wherein at least one sender and all receivers belong to a multi-casting group of endpoints, the at least one sender and all receivers are located on a single spanning delivery tree, and only one virtual circuit (VC) is employed to transmit data over said single spanning deliver tree;
   a group having members closely located to each other configured to use a multi-cast group address held by an MNS server located close to said group members; and
   the MNS server located close to said group members is selected by requesting a local MNS server for a new multi-cast group address from a host, said local MNS server being configured to supply a multi-cast address from its own addresses, or said local MNS server being configured to supply an address for a nearest located other MNS server if said local MNS server has no unused addresses.

2. An IPATM transmission network, as claimed in claim 1, wherein said single spanning delivery tree is a CBT rooted in a core node.

3. An IPATM transmission network, as claimed in claim 2, wherein said CBT is built at an ATM level.

4. An IPATM transmission network, as claimed in claim 2, wherein said IPATM transmission network includes relocation means for relocating the core.

5. An IPATM transmission network, as claimed in claim 2, wherein said IPATM transmission network includes MNS means for providing an ATM address for a core, on receipt of an IP multi-cast address.

6. An IPATM transmission network, as claim in claim 5, wherein said MNS means is adapted to provide core point management and multi-cast group management.

7. An IPATM transmission network, as claimed in claim 5, wherein said MNS means includes a hierarchy of MNS servers.

8. An IPATM transmission network, as claimed in claim 5, wherein said IPATM transmission network has only one MNS server, that said only one MNS server is responsible for all multi-cast group addresses.

9. An IPATM transmission network, as claimed in claim 1, wherein said IPATM transmission network is adapted to have more than one active core, said more than one active core being geographically remote from each other.

10. An IPATM transmission network, as claimed in claim 1, further comprising forwarding means for forwarding traffic only to those branches of said single spanning delivery tree where said traffic is required.

11. An IPATM transmission network, as claimed in claim 10, wherein operation of said forwarding means does not depend on a location of a core.

12. An IPATM transmission network, as claimed in claim 1, wherein said MNS means includes border routers adapted to translate between protocols thereby enabling said MNS means to co-exist with other multicast protocols.

13. An IPATM transmission network, as claimed in claim 1, further comprising means for permitting leaf initiated join.

14. An IPATM transmission network, as claimed in claim 1, further comprising means for facilitating an endpoint to switch from functioning as a sender to functioning as a receiver.

15. An IPATM transmission network, as claimed in claim 1, further comprising means for facilitating an endpoint to switch from functioning as a receiver to functioning as a sender.

16. An IPATM transmission network, as claimed in claim 1, further comprising means for enabling a new member to join a group, said means being adapted to cause a join message to be propagated towards a core of said group.

17. An IPATM transmission network, as claimed in claim 1, wherein multipoint-to-multipoint connections are provided at the ATM level.

18. An IPATM transmission network, as claimed in claim 1, wherein ATM switches in said IPATM transmission network are adapted to behave as store and forward units in the presence of contention, and to behave as cell switches in the absence of contention.

19. An IPATM transmission network, as claimed in claim 1, further comprising a VC merging means for preventing interleaving of ATM cells; and
   a core selection means for optimising the shape of a structure of a spanning delivery tree.

20. A telecommunications system, wherein said telecommunications system includes an IPATM transmission network as claimed in claim 1.

21. An IPATM transmission network that supports multipoint-to-multipoint multi-casting between groups of endpoints, said network comprising:
a plurality of nodes;
a plurality of endpoints adapted to act as data senders, or receivers, said nodes and endpoints being linked by ATM,
wherein said IPATM transmission network includes means for building a single spanning delivery tree between at least one sender and all receivers that belong to a multi-casting group of endpoints, only one virtual circuit (VC) is employed to transmit data over said single spanning delivery tree,
an endpoint in the multi-casting group of endpoints is configured to request an address of a core from an MNS server in a plurality of MNS servers, receive the address of the core from the MNS server when the MNS server is a server responsible for the multi-casting group of endpoints, and receive the address of the core from another MNS server in the plurality of MNS servers when the MNS server is not the server responsible for the multi-casting group of endpoints,
the received address of the core being an address of the endpoint when no core is specified for the multicasting group of endpoints at the server responsible for the multicasting group of endpoints.

22. A method of multipoint-to-multipoint multi-casting in an IPATM transmission network comprising a plurality of nodes and a plurality of endpoints adapted to act as data senders, or receivers, said nodes and endpoints being linked by ATM, said method comprising:
building a single spanning delivery tree between at least one sender and all receivers that belong to a multi-casting group of endpoints;
employing only one virtual circuit VC to transmit data over said single spanning delivery tree;
receiving an address of a core from an MNS server in a plurality of MNS servers when the MNS server is responsible for the multi-casting group of endpoints; and
receiving the address of the core from another MNS server in the plurality of MNS servers when the MNS server is not the server responsible for the mult-casting group of endpoints,
wherein the received address of the core is an address of the endpoint when no core is specified for the multi-casting group of endpoints at the server responsible for the multicasting group of endpoints.

23. A method, as claimed in claim 22, wherein said single spanning delivery tree includes a CBT rooted in a core node.

24. A method, as claimed in claim 23, further comprising propagating join requests from receivers and senders towards said core.

25. A method, as claimed in claim 23, further comprising providing an ATM address for the core for said MNS, when given an IP multi-cast address.

26. A method as claimed in claim 25, further comprising:
configuring a host seeking to use said MNS with an ATM address for a local MNS server;
transmitting a query to a local MNS server for an address for the core of said multi-casting group from said host when it seeks to become a member of a multi-casting group;
replying with an ATM address for the core from said local MNS server if it is responsible for the multi-casting group;
passing the query between MNS servers in a MNS hierarchy until the query reaches a MNS server which is responsible for said group and said responsible MNS server replying to the querying host if said local MNS server is not responsible for the group,
wherein said MNS hierarchy includes a root MNS server which knows which server at the next level is responsible for which intervals of multi-cast address space, and second level MNS servers are configured to know how an address range they are responsible for is divided into smaller address intervals and which third level MNS server is responsible for which address interval; and
sending queries through the MNS server hierarchy until reaching the MNS server that holds the tables for the groups for which it is responsible.

27. A method, as claimed in claim 26, wherein said transferring the query further comprises:
passing a query to a root MNS server, which passes it on, if an MNS server is not responsible for a group; and
passing a query only one level up the MNS hierarchy, and not directly to the root MNS server.

28. A method, as claimed in claim 25, further comprising registering the core node for a multi-cast group with the MNS server responsible for the group;
electing the switch that sent the query as the core if a query arrives at the MNS server about a group and no core is specified for the group, said switch being able to decline nomination as the core; and
not establishing a spanning deliver tree if said switch does not accept nomination as the core.

29. A method, as claimed in claim 25, further comprising:
using a multi-cast group address held by an MNS server located close to group members in a group having members closely located to each other; and
selecting an MNS server located close to said group members by requesting a local MNS server for a new multi-cast group address, said local MNS server then being responsible for supplying a multicast address from its own addresses, and supplying an address for the nearest other MNS server to said local MNS server if said local MNS server has no unused address.

30. A method, as claimed in claim 22, further comprising relocating the core to optimise a structure of said spanning delivery tree.

31. A method, as claimed in claim 22, further comprising forwarding traffic only to those branches of said single spanning delivery tree where said traffic is required.

32. A method, as claimed in claim 22, further comprising replicating packets only on branches of said spanning delivery tree where they are needed.

33. A method, as claimed in claim 32, further comprising:
starting every MNS server with an empty table; and
dynamically creating entries therein.

34. A method, as claimed in claim 22, further comprising causing a join message to be propagated towards a core of said group when a new member seeks to join a group.

35. A method as claimed in claim 22, further comprising:
transmitting a leave message towards a core of said group over the spanning delivery tree associated with the group when a member of that group seeks to leave the group, said leave message travelling until it reaches a first junction of said spanning delivery tree; and removing that part of said spanning delivery tree over which said message has travelled.

36. A method, as claimed in claim 22, further comprising periodically sending an "I am alive" message from group members to neighbouring nodes, or endpoints.

37. An IPATM transmission network that supports multipoint-to-multipoint multi-casting between groups of endpoints, said network comprising:

a plurality of nodes;

a plurality of endpoints adapted to act as data senders, or receivers, said nodes and endpoints being linked by ATM, wherein said nodes and endpoints are configured to build a single spanning delivery tree building device configured to build a single spanning delivery tree between at least one sender and all receivers that belong to a multi-casting group of endpoints, only one virtual circuit (VC) is employed to transmit data over said single spanning delivery tree, an endpoint in the multi-casting group of endpoints is configured to request an address of a core from an MNS server in a plurality of MNS servers, receive the address of the core from the MNS server when the MNS server is a server responsible for the multicasting group of endpoints, and receive the address of the core from another MNS server in the plurality of MNS servers when the MNS server is not the server responsible for the multi-casting group of endpoints, the received address of the core being an address of the endpoint when no core is specified for the multicasting group of endpoints at the server responsible for the multicasting group of endpoints.

* * * * *